United States Patent
Long

(10) Patent No.: US 6,573,523 B1
(45) Date of Patent: Jun. 3, 2003

(54) SUBSTRATE SURFACE SCANNING

(75) Inventor: Thomas F. Long, Corbett, OR (US)

(73) Assignee: LSI Logic Corporation, Milpitas, CA (US)

( * ) Notice: Subject to any disclaimer, the term of this patent is extended or adjusted under 35 U.S.C. 154(b) by 28 days.

(21) Appl. No.: 10/021,829

(22) Filed: Dec. 12, 2001

(51) Int. Cl.$^7$ .............................................. G01V 8/00
(52) U.S. Cl. ............................ 250/559.4; 250/559.44; 235/454
(58) Field of Search .......................... 250/559.22, 202, 250/559.44, 559.45, 555, 208.1, 556, 559.4; 356/71, 625, 338, 364, 634–635, 394, 239.3, 237.4, 237.5; 382/182, 195, 218; 358/488, 498; 235/454, 462.06

(56) References Cited

U.S. PATENT DOCUMENTS

| | | | |
|---|---|---|---|
| 3,714,632 A | * | 1/1973 | Cribbs et al. ................ 382/226 |
| 5,247,166 A | * | 9/1993 | Cannon et al. .......... 250/208.1 |
| 5,481,095 A | * | 1/1996 | Mitsuda et al. ............. 235/454 |
| 5,677,522 A | * | 10/1997 | Rice et al. ................... 235/454 |

\* cited by examiner

*Primary Examiner*—David Porta
*Assistant Examiner*—Patrick J Lee
(74) *Attorney, Agent, or Firm*—Luedeka, Neely & Graham P.C.

(57) ABSTRACT

A system for identifying a substrate based on indicia formed in a surface of the substrate. The method includes forming the indicia having edge features and substantially flat features. The indicia is illuminated with incident illumination from an illumination source while moving the illumination source relative to the substrate, thereby scanning the incident illumination over the indicia. Reflected illumination having a first intensity level is received from the edge features of the indicia, and reflected illumination having a second intensity level is received from the substantially flat features of the indicia. The reflected illumination is detected to produce at least one output signal having a first amplitude level corresponding to the first intensity level and a second amplitude level corresponding to the second intensity level. The output signal is processed based at least in part upon the first and second intensity levels to form at least one image portion of the indicia. The indicia is recognized based at least in part upon the at least one image portion. The substrate is then identified based on the indicia.

14 Claims, 7 Drawing Sheets

(Section I-I)

(Section I-I)

SUBSTRATE SURFACE SCANNING

FIELD

This invention relates to the field of integrated circuit fabrication. More particularly, the invention relates to identifying a substrate by detecting indicia formed on the surface of the substrate.

BACKGROUND

The substrates on which integrated circuits are fabricated typically undergo several process steps. It is desirable to identify the substrate at each step of the process, so as to track the substrate through the various fabrication and testing steps. It is further desirable to identify the substrate by automated means rather than by human operators, so as to reduce potential damage due to mishandling, reduce subjective variation in the identification process, and to speed the fabrication process.

Typically, substrates are identified by characters, such as the alphanumeric characters of a serial number, which have been formed in the surface of the substrate. These characters are used in tracking and verifying the idntity of the substrate throughout the manufacturing process to ensure that the proper process steps are performed on the substrate. In prior systems, the substrate identification characters are read using a charge coupled device (CCD) camera which captures a digital image of the identification characters. In other words, a digital photograph of the substrate is taken.

Generally, the prior systems process the characters using character recognition algorithms which must be "taught" how to recognize the expected characters based on sample characters provided on the surface of a calibration substrate. How well the algorithm is able to recognize characters on an process substrate depends at least in part on how well the process substrate's surface matches the surface of the calibration substrate and how closely the environment of the calibration substrate matches that of the process substrate.

For example, the amount of light, the color of the substrate surface, the angle of the substrate surface relative to the optical axis of the camera, and the distance between the substrate and the camera all have an effect. During substrate processing, the color of the surface of the substrate may change significantly from step to step. To accommodate these expected changes in color, the calibration of the substrate identification systems at each of the process steps should take these changes into account.

Due to the level of effort required to calibrate and maintain the current substrate identification systems, such systems are typically not used at each process step. The lack of such systems at each process step increases the likelihood that a substrate will miss a required process step, or will otherwise be handled improperly.

What is needed, therefore, is a reliable process for identifying a substrate, preferably at each manufacture and testing step, where the reliability of the identification process is not significantly affected by changes in the optical characteristics of the surface of the substrate or by other environmental factors.

SUMMARY

The above and other needs are met by a method for identifying a substrate having a surface. The method includes forming in the surface of the substrate indicia having an indicia length in a first direction and an indicia width in a second direction, and having edge features and substantially flat features. The indicia is illuminated with incident illumination from an illumination source, where the incident illumination has an illumination length substantially in the first direction and an illumination width substantially in the second direction.

Relative motion is generated between the substrate and the illumination source, thereby scanning the incident illumination over the indicia. Reflected illumination having a first intensity level is received from the edge features of the indicia, and reflected illumination having a second intensity level is received from the substantially flat features of the indicia.

The reflected illumination is detected to produce at least one output signal having a first amplitude level corresponding to the first intensity level and a second amplitude level corresponding to the second intensity level. The at least one output signal is processed based at least in part upon the first and second intensity levels to form at least one image portion of the indicia. The indicia is recognized based at least in part upon the at least one image portion. The substrate is then identified based at least in part upon the indicia.

In preferred embodiments of the invention, the reflected illumination is detected using a substantially linear array of detection devices that are substantially aligned in the first direction and distributed over a length substantially equal to the illumination length. The plurality of detection devices produce a corresponding plurality of output signals which are processed based at least in part upon the first and second intensity levels to form a corresponding plurality of image portions of the indicia. The plurality of image portions are combined to form a two-dimensional image of the indicia. The indicia is recognized based at least in part upon the two-dimensional image.

Since the indicia is recognized based on a pattern of edge features and flat features, the recognition process is not substantially affected by changes in environmental lighting conditions, or changes in the color or reflectivity of the surface of the substrate from one process step to the next. Also, because recognition of the indicia is not based upon indicia characteristics that differ significantly from one process step to the next, the system does not require constant teaching and learning to recognize the indicia, as have prior identification systems.

BRIEF DESCRIPTION OF THE DRAWINGS

Further advantages of the invention are apparent by reference to the detailed description when considered in conjunction with the figures, which are not to scale so as to more clearly show the details, wherein like reference numbers indicate like elements throughout the several views, and wherein.

DETAILED DESCRIPTION

Depicted in FIGS. 1–7 is a substrate identification system 10 for identifying a substrate 16, such as an integrated circuit substrate as may be formed of a semiconductor material, such as silicon or gallium arsenide. As described in more detail hereinafter, the substrate 16 preferably undergoes an identification process at various points in an integrated circuit fabrication process flow. As the substrate 16 proceeds through the fabrication process, some physical characteristics of the surface of the substrate 16 tend to change, thus altering the visual characteristics of any identifying indicia on the surface 15 of the substrate 16. Thus, the system 10 is operable to detect those aspects of the identifying indicia on the surface of the substrate 16 that do not tend to change as much as other aspects of the identifying indicia. Preferably, the system 10 as described herein is implemented at several different fabrication stations, inspection stations, and test stations, and most preferably all such, to provide reliable identification of the substrate 16 at any particular point in the fabrication process.

Figure 2:
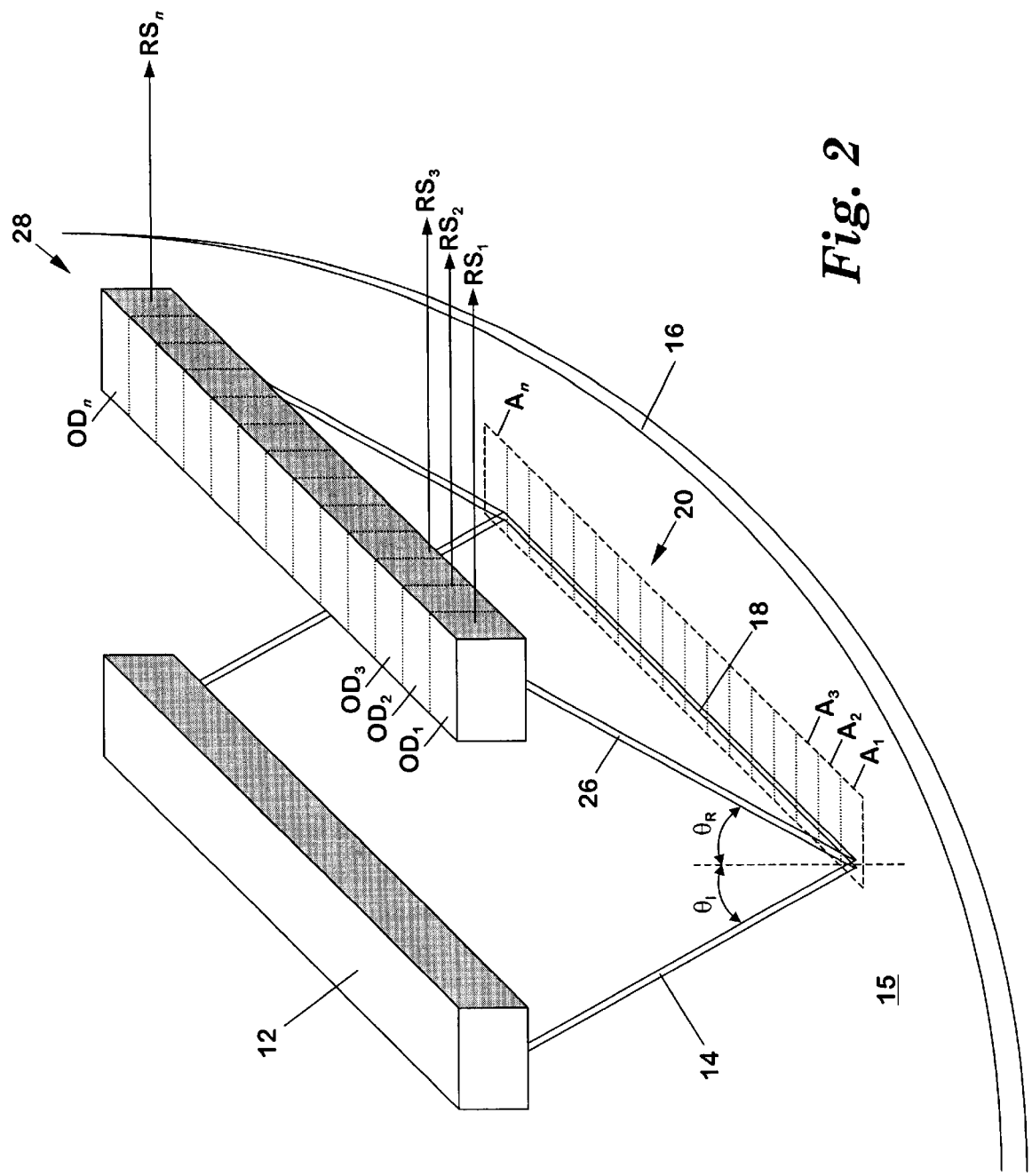
FIG. 2 depicts a radiation source and radiation sensor according to a preferred embodiment of the invention.
Figure 3:
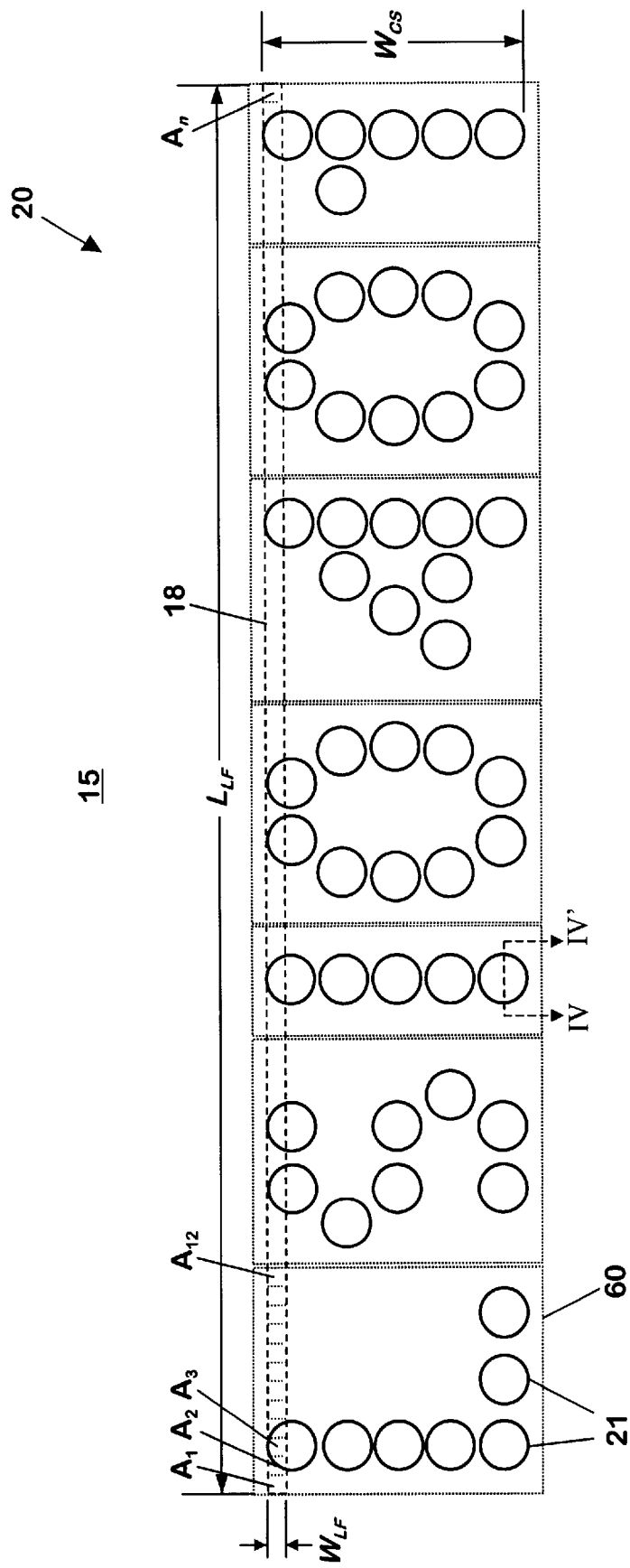
FIG. 3 depicts indicia formed on the surface of a substrate according to a preferred embodiment of the invention.

As shown in FIGS. 2 and 3, substrate identification means such as indicia 20 are formed in a surface 15 of the substrate 16. (Step 100 in FIG. 5). For example, the indicia 20 may be a combination of alphanumeric characters that is unique to a particular substrate 16. Alternately, the indicia 20 may have no relevance as far as standardized numbers or alphabet are concerned, but are formed to be relatively unique from one substrate 16 to another, so that the system 10 can distinguish one substrate 16 from another, and identify the given substrate 16 to other systems, as described in more detail below.

As depicted in FIG. 3, the indicia 20 preferably comprise a pattern of recesses 21 in the surface 15 formed by the selective removal of substrate material, such as by laser ablation, or chemical or physical etching. The recesses 21 within the indicia 20 are preferably about four microns wide by about four microns deep, although the operation of the invention is not dependent upon any particular dimensional constraints of the recesses 21. However, there are various characteristics of the identification system 10 that are preferably determined based at least in part upon the size of the recesses 21, as described in more detail below.

Figure 4A:
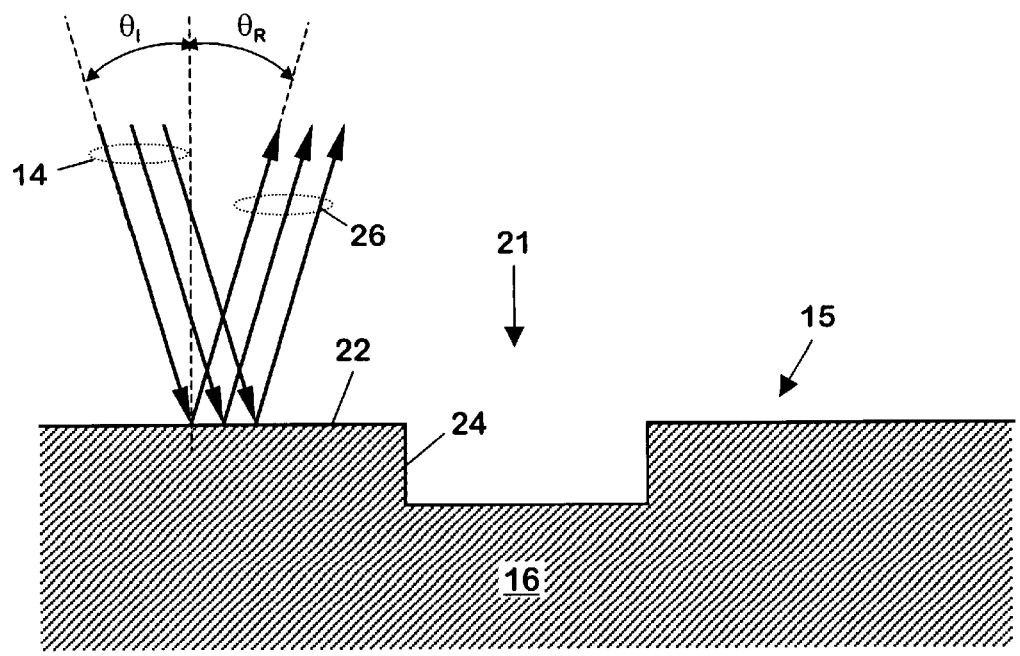
FIGS. 4A–4B depict scanning radiation over flat features and edge features of a recess in the surface of a substrate according to a preferred embodiment of the invention.
Figure 4B:
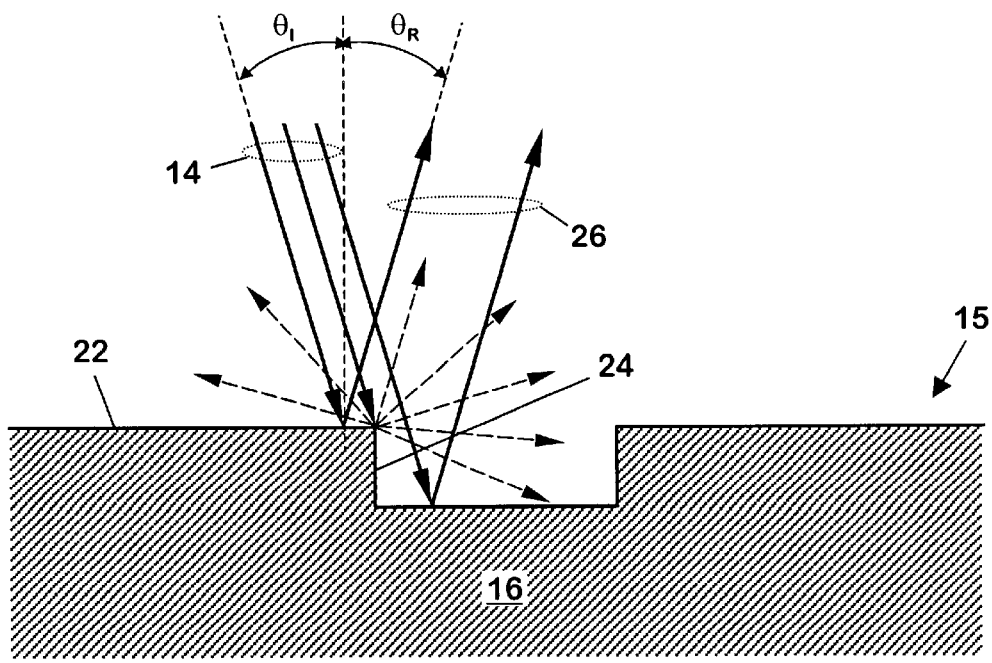
Figure 5:
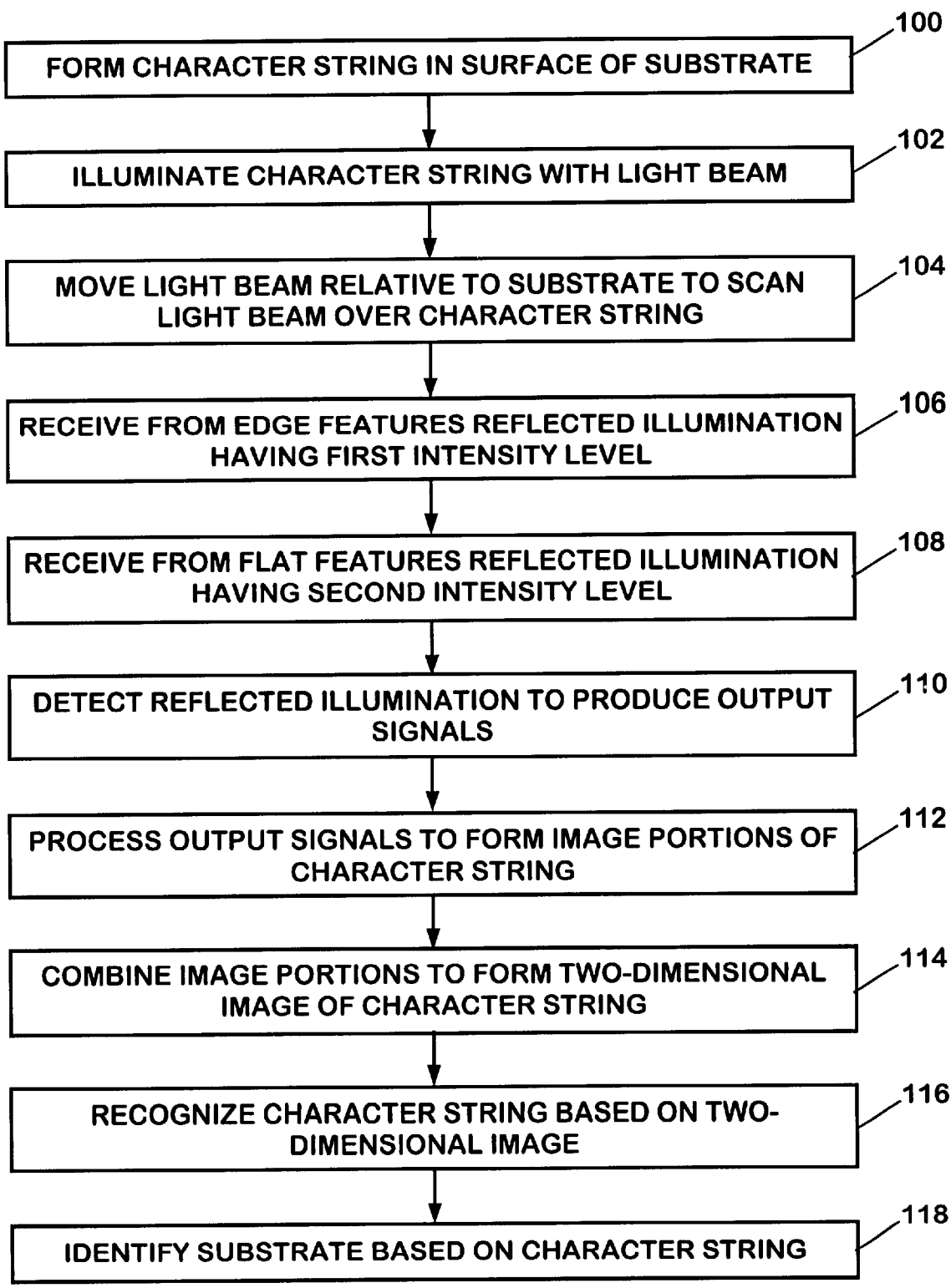
FIG. 5 depicts a flow chart of a method for scanning and identifying a substrate according to a preferred embodiment of the invention.

FIGS. 4A and 4B depict a cross-sectional view corresponding to the section line IV–IV' shown in FIG. 3. As shown in FIGS. 4A and 4B, the characters in the indicia 20, such as the character "I" in the identification string "LSI0401", include edge features 24 at the edges of the recesses 21, and substantially flat features 22 between the recesses 21. Although the edge features 24 are depicted in FIGS. 4A and 4B as substantially vertical, it is appreciated that the edge features in other embodiments are sloping, curved, or undercut depending on the method used to form the recesses 21. Further, although the features 22 are depicted as substantially flat, they may actually have some degree of surface roughness or waviness, depending on the processing which has been performed on the substrate 16.

Figure 1:
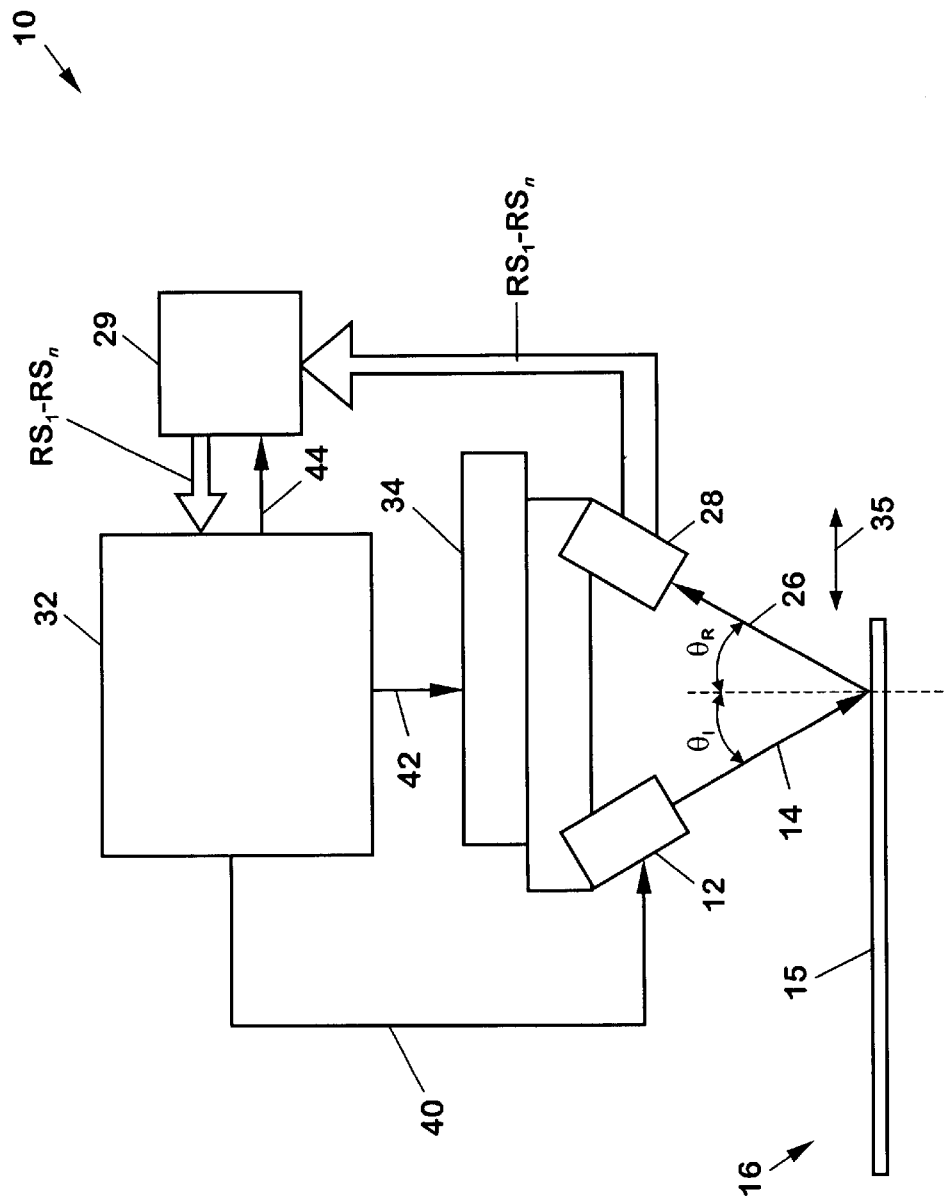
FIG. 1 depicts a substrate surface identification system according to a preferred embodiment of the invention.

With reference to FIGS. 1 and 2, the system 10 includes a radiation source 12 for generating radiation such as a light beam 14 that is incident upon the surface 15 of the substrate 16 at an incidence angle $\theta_I$ with respect to normal to the surface 15 (step 102). In a preferred embodiment of the invention, the illumination source 12 includes a low-power light and associated optics for providing the incident illumination 14 in the form of a planar light beam 14. As shown in FIG. 3, the beam 14 provides a light footprint 18 having a footprint length $L_{LF}$ and a footprint width $W_{LF}$ on the surface 15 of the substrate 16. For the system 10 to resolve the individual recesses 21, the width $W_{LF}$ of the light footprint 18 is preferably no greater than about one-half to one quarter the breadth of a recess 21.

Preferably, the radiation generated by the radiation source 12 is at a wavelength that is reflected by the material of the substrate 16. In a most preferred embodiment, the radiation is reflected by the substrate 16, but not the other materials that may be deposited on the substrate 16 as it is processed. In alternate embodiments, the substrate 16 is partially transparent to the radiation, but receptors on the other side of the substrate 16 from the radiation source 12 are operable to detect subtle variations in a characteristic of the transmitted radiation, such as either intensity, phase, or transmission angle. Thus, the invention as described herein is not specifically limited to those embodiments that are described with greater particularity below.

It is further appreciated that the radiation footprint 18 may be much smaller than that as depicted in FIG. 3. For example, the radiation footprint 18 may be a dot having a diameter as determined by the size considerations as given elsewhere herein, which dot is scanned back and forth across the surface 15 of the substrate 16 in the area where the indicia 20 is formed.

Although a laser is the preferred illumination source 12, it is appreciated that other light sources could be used to provide the illumination 14, such as an array of light-emitting diodes. Preferably, the illumination source 12 operates at a wavelength which does not adversely affect any of the substrate processing steps, or the materials used during such, or the structures thereby formed in the substrate 16. In the preferred embodiment, the wavelength of radiation produced by the radiation source 12 is about 640 nanometers.

For convenience of discussion, the incident illumination 14 is depicted in FIGS. 4A and 4B as a series of parallel rays. As shown in FIG. 4A, when the incident illumination 14 is reflected from a flat feature 22, the reflected illumination 26 is substantially specular, such that a substantial portion of the reflected illumination 26 propagates at a reflection angle $\theta_R$ which is substantially equivalent to the incidence angle $\theta_I$. For a flat feature 22, the intensity of the reflected illumination 26 at the angle $\theta_R$ is determined by the intensity of the incident illumination 14 and the reflectivity of the surface of the flat feature 22. The intensity of the illumination 26 reflected from a flat feature 22 is referred to herein as a second intensity.

As shown in FIG. 4B, when the incident illumination 14 is reflected from one of the edge features 24, the reflected illumination 26 is not specular, but rather is scattered at angles other than $\theta_R$ with respect to normal to the surface 15. Due to the edge scattering, the intensity of the illumination 26 reflected from an edge feature 24 in the specular direction (at the angle $\theta_R$) is substantially less than the intensity of the illumination 26 reflected in the specular direction from a flat feature 22. The intensity of the illumination 26 reflected from an edge feature 24 is referred to herein as a first intensity.

As described in more detail below, the system 10 uses the difference in the intensity of the illumination reflected from an edge feature 24 as compared to the intensity of the illumination reflected from a flat feature 22 in forming an image of the indicia 20. As briefly mentioned above, the system 10 in alternate embodiments has sensors disposed on an opposite side of the substrate 16 from the radiation source 12, and uses the change in characteristics of the transmitted radiation from edge features 24 and flat features 22.

Referring again to FIGS. 1 and 2, the system 10 includes a radiation sensor 28 for receiving the reflected illumination 26 propagating at the angle $\theta_R$ with respect to normal to the surface 15. In the preferred embodiment, the radiation sensor 28 comprises an array of n number of optical detectors $OD_1$–$OD_n$. In alternate embodiments, where the radiation footprint 18 is a single dot, as described above, the radiation sensor 28 is a relatively small, single receptor. Preferably, the radiation sensor 28 includes focusing optics for focusing the illumination 26 reflected from n number of incremental areas $A_1$–$A_n$ of the surface 15 of the substrate 16 onto corresponding ones of the n number of detectors $OD_1$–$OD_n$. For the system 10 to resolve the individual recesses 21, the width of each incremental area $A_1$–$A_n$ is preferably no greater than about one-half to one quarter the breadth of a recess 21.

Each detector $OD_1$–$OD_n$ preferably generates a corresponding analog electrical output signal $RS_1$–$RS_n$ the amplitude of which is proportional to a characteristic of the radiation, such as the intensity of the illumination 26 reflected from the corresponding incremental area and propagating at the angle $\theta_R$. Since the intensity of the reflected illumination 26 propagating at the angle $\theta_R$ is dependent on whether the incident illumination 14 impinges on a flat feature 22 or an edge feature 24, the amplitude of each of the output signals $RS_1$–$RS_n$ is also dependent at least in part on whether the illumination 26 is reflected from a flat feature 22 or an edge feature 24 within the illuminated incremental area $A_1$–$A_n$.

As shown in FIG. 1, the system 10 optionally includes a motion stage 34 for moving the source 12 and the sensor 28 in at least one scan direction 36 relative to the substrate 16. The movement of the motion stage 34 is controlled by a processing system 32, such as may be part of a personal computer, machine controller, or other dedicated computing device. In alternate embodiments, the scanning of the substrate 16 is accomplished by external substrate staging means, such as a robotic arm that is a part of a substrate processing apparatus. In such an embodiment, the indicia 20 are scanned as the staging means inserts the substrate 16 into the system 10, and no additional motion stage 34 is required.

Regardless of whether the relative motion is provided by the system 10 or an external means, the surface 15 containing the indicia 20 is preferably moved relative to the light footprint 18 in a scan across the width $W_{CS}$ of the indicia 20, so that the light footprint 18 sequentially illuminates substantially all of the features of the indicia 20 (step 104). As described above, movement such as in a transverse direction may also be desirable, based at least in part on the length of the radiation footprint 18. As various flat features 22 and edge features 24 (FIGS. 4A–B) are illuminated during the scan, the array of radiation detectors: $OD_1$–$OD_n$ receives reflected illumination 26 having the first intensity level from the edge features (step 106), and receives reflected illumination 26 having the second intensity level from the flat features (step 108).

Each of the of detectors $OD_1$–$OD_n$ detects a corresponding portion of the reflected illumination 26 and generates a corresponding output signal $RS_1$–$RS_n$ which is provided to a signal conditioning circuit 29 (step 110). Preferably, the signal conditioning circuit includes amplifiers, noise filters, and analog-to-digital converters which provide preprocessing conditioning of the output signals $RS_1$–$RS_n$. After filtering, amplification, and analog-to-digital conversion, the output signals $RS_1$–$RS_n$ are provided to the processing system 32.

In the preferred embodiment, the processing system 32 processes the output signals $RS_1$–$RS_n$ to form corresponding image portions of the indicia 20 (step 112). The processing of step 112 preferably includes converting each of the output signals $RS_1$–$RS_n$ into a one-dimensional bit map of pixels having values corresponding to the amplitude of the corresponding output signal $RS_1$–$RS_n$ as the light footprint 18 is scanned over the indicia 20. The processing system 32 preferably combines the multiple one-dimensional bit maps to form a two-dimensional image of the indicia 20 (step 114).

Figure 6:
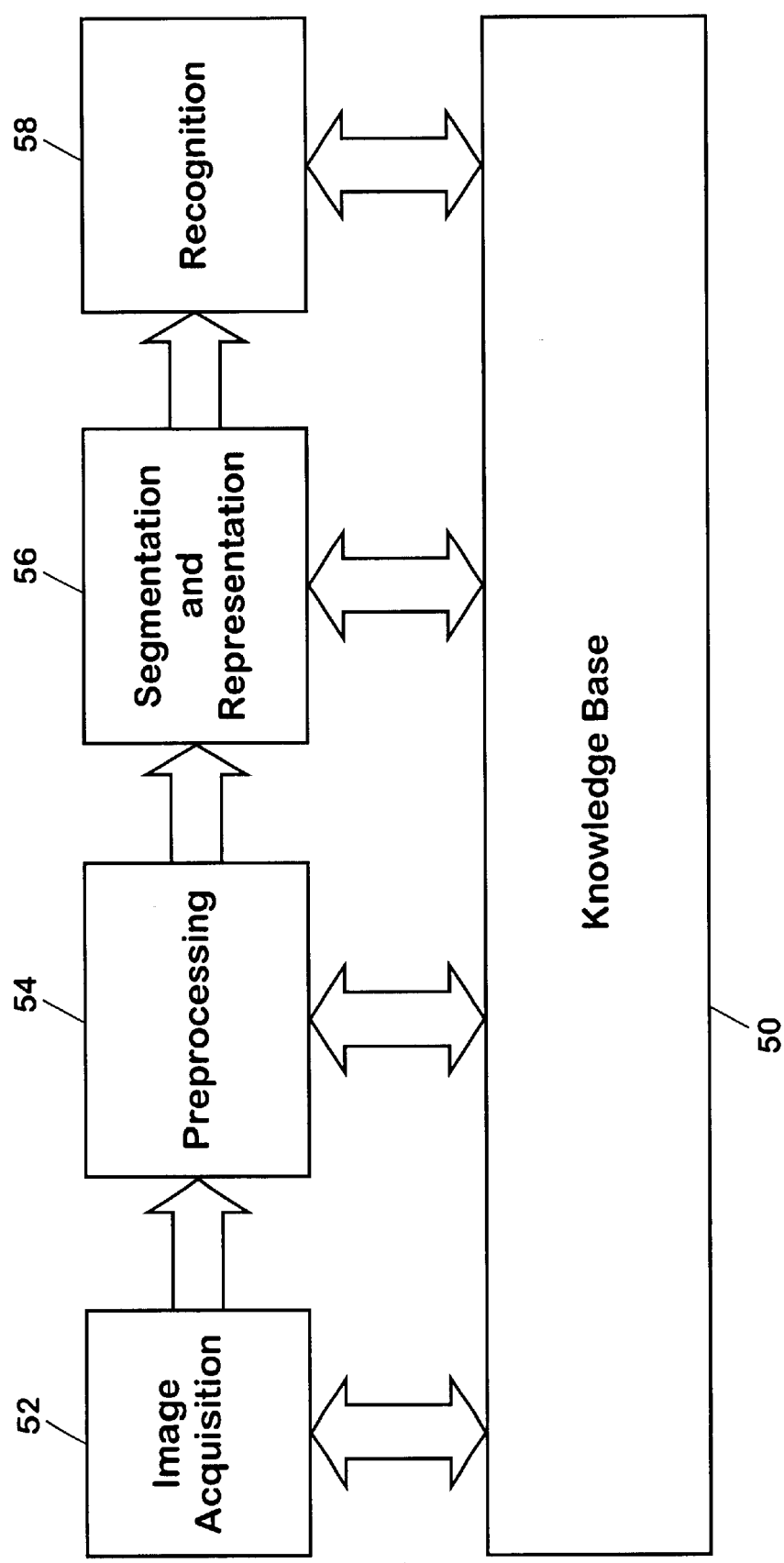
FIG. 6 depicts a functional block diagram of a system for identifying a substrate according to a preferred embodiment of the invention.

Shown in FIG. 6 is a functional block diagram of exemplary functions executed by the processing system 32 in acquiring and processing the image of the indicia 20. Each of the functions receives input from a knowledge base 50. Preferably, the knowledge base 50 is a collection of information related to characteristics of the substrate 16, control parameters, character representation, etc. Generally, the information in the knowledge base 50 represents knowledge acquired by engineers and test operators over a period of time, during which substrates have been identified at various processing steps during the manufacturing of an integrated circuit. The various types of information provided in the knowledge base 50 are explained in more detail in the following discussion of the various functions of the processing system 32.

The image acquisition function 52 includes the generation of control signals which control the illumination source 12 and the motion stage 34. In the preferred embodiment, the image acquisition function 52 generates an intensity control signal 40 (FIG. 1) for controlling the intensity of the illumination 14 provided by the illumination source 12. For example, the illumination intensity may be adjusted based upon the material which comprises the uppermost layer of the substrate 16, the composition of which is generally dependent upon the point in the manufacturing process at which the substrate 16 is being identified. Similarly, the speed at which the motion stage 34 scans the incident illumination 14 over the indicia 20 may be controlled by a motion control signal 42 (FIG. 1) generated by the image acquisition function 52. These preferred intensity settings and speed settings are preferably stored in the knowledge base 50.

The preprocessing function 54 includes the generation of control signals which control the signal conditioning circuit 29. For example, the preprocessing function 54 preferably generates control signals 44 (FIG. 1) for controlling the amplitude of the output signals $RS_1$–$RS_n$ and the shape of noise filter functions applied to the output signals $RS_1$–$RS_n$. These preferred amplifier and filter settings, which may also be dependent on the point in the manufacturing process at which the substrate 16 is being identified, are preferably also stored in the knowledge base 50.

The segmentation and representation function 56 breaks the two-dimensional image of the indicia 20 into separate segments, and represents each segment as a two-dimensional image. As depicted in FIG. 3, each character segment, such as the "L" segment 60, preferably includes only one complete character. In the preferred embodiment, boundaries of the character segments are determined by position. For example, as shown in FIG. 3, the segment 60 is defined by the incremental areas $A_1$ to $A_{12}$ scanned over the indicia width $W_{CS}$. However, it will be appreciated that segment boundaries may be determined by other means, such as by finding "blank space" between characters based on adjacent output signals having a constant intensity (indicating no recesses 21) over a complete scan of the indicia width $W_{CS}$.

Figure 7:
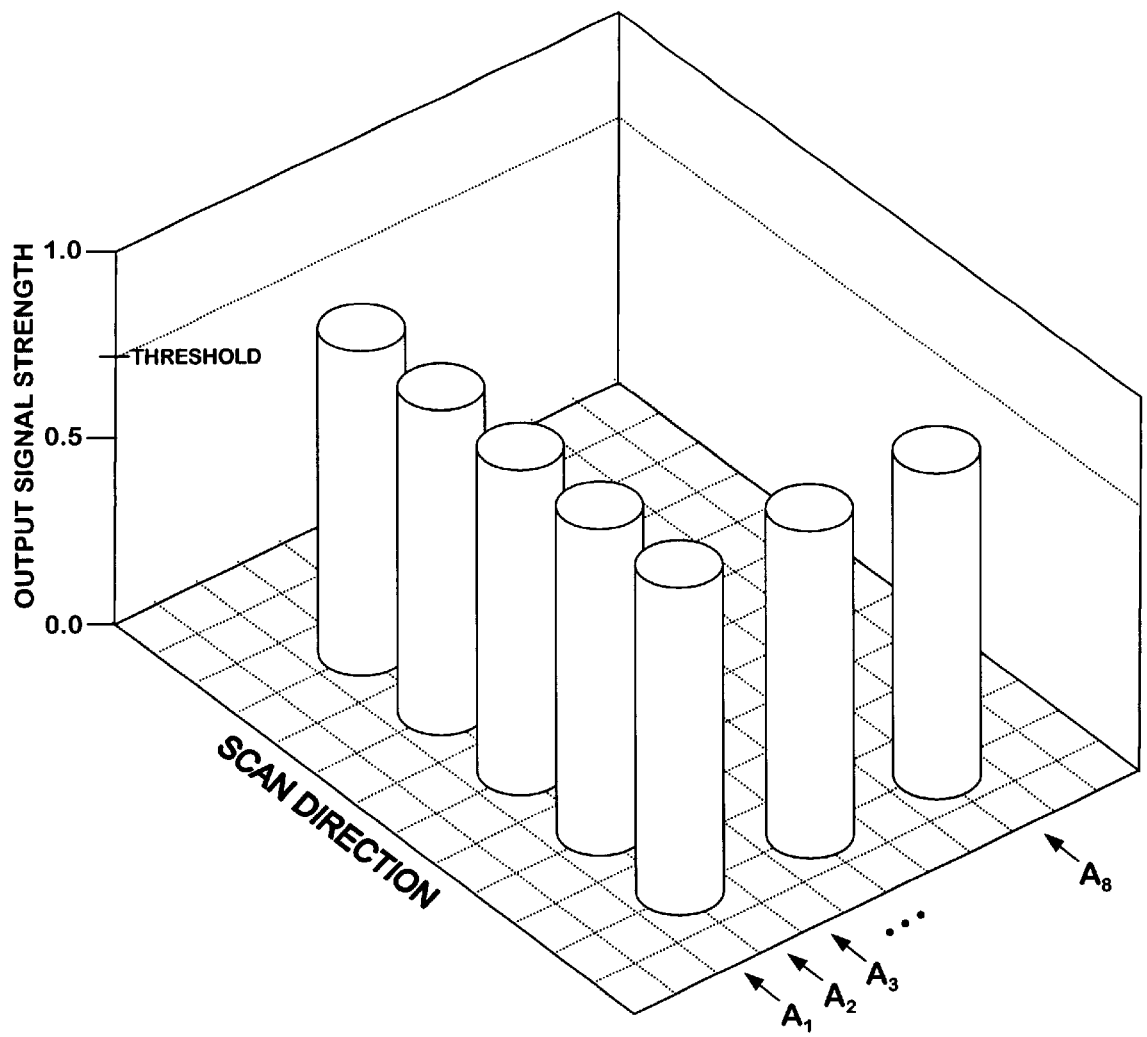
FIG. 7 depicts a graphical representation of a character segment according to a preferred embodiment of the invention.

FIG. 7 depicts a representation of the surface topology of the character "L" after noise filtering, analog-to-digital conversion, and segmentation. The peaks in the inverted output signal correspond to the recesses 21 (FIG. 3) which form the "L" in the surface 15 of the substrate 16. Only peaks that are above a threshold level are used in the subsequent recognition function 58. Peaks which fall below the threshold level are discarded as surface imperfections or noise. Preferably, the threshold levels, which may be different for different processing stages during fabrication and inspection of the substrate 16, are preferably stored in the knowledge base 50.

With reference to FIG. 6, the recognition function 58 compares the representation of a character, such as depicted in FIG. 7, to character patterns stored in the knowledge base 50, and the character pattern which best matches the representation is selected (step 116). The recognition function 58 repeats this process for each character representation from each segment, and generates an identification string corresponding to the recognized indicia 20, which in a preferred embodiment comprise alphanumeric characters.

Based on the alphanumeric textual string, the processing system 32 identifies the substrate 16, such as by using a relational database stored in the processing system 32 or in another processing system connected to the system 32 by a network (step 118).

The system 10 provides several benefits not realized by identification systems incorporating CCD cameras. First, the optical components of the system 10, including the source 12 and the receiver 28, may be implemented in a compact package which may be installed at practically every fabrication process station. Second, since the system 10 may be implemented without expensive high-performance central processing units as are required to process the color and grayscale images produced by CCD cameras, the system 10 is less expensive. Third, the system 10 does not require constant teaching and learning using a calibration substrate to recognize the indicia 20. Rather, the system 10 need only be taught once the pattern of recesses which makes up each character. Fourth, the operation of the system 10 is not substantially affected by changes in environmental lighting conditions, or changes in the color or reflectivity of the surface of the substrate from one process step to the next.

In the preferred embodiment of the invention, relative movement between the substrate and the source/receiver is accomplished by moving the source/receiver and keeping the substrate stationary. However, one skilled in the art will appreciate that the relative movement could also be accomplished by moving the substrate and keeping the source/detector stationary. Thus, the scope of the invention is not limited by the manner in which relative motion between the substrate and the source/receiver is accomplished.

It should also be appreciated that the source/receiver could be configured to scan across the length of the indicia rather than across the width. Thus, the scope of the invention is not limited by the scanning direction.

Although moving the source/receiver linearly across the indicia is the preferred method of scanning the indicia, it should be appreciated that scanning may also be accomplished by rotating the illumination source relative to the substrate, thereby sweeping the illumination beam over the indicia. In this alternative embodiment, the system is preferably configured to maintain $\theta_1$ equal to $\theta_R$ as the illumination beam is swept over the indicia.

The foregoing description of preferred embodiments for this invention have been presented for purposes of illustration and description. They are not intended to be exhaustive or to limit the invention to the precise form disclosed. Obvious modifications or variations are possible in light of the above teachings. The embodiments are chosen and described in an effort to provide the best illustrations of the principles of the invention and its practical application, and to thereby enable one of ordinary skill in the art to utilize the invention in various embodiments and with various modifications as is suited to the particular use contemplated. All such modifications and variations are within the scope of the invention as determined by the appended claims when interpreted in accordance with the breadth to which they are fairly, legally, and equitably entitled.

What is claimed is:

1. A method for identifying a substrate having a surface, the surface of the substrate having indicia with an indicia length in a first direction and an indicia width in a second direction, and having edge features and substantially flat features, the method comprising:

(a) radiating the indicia with incident radiation from a radiation source, the incident radiation having a radiation length substantially in the first direction and a radiation width substantially in the second direction, (b) generating relative motion between the substrate and the radiation source, thereby scanning the incident radiation over the indicia, (c) receiving reflected radiation having a first intensity level from the edge features of the indicia, (d) receiving reflected radiation having a second intensity level from the substantially flat features of the indicia, (e) detecting the reflected radiation to produce at least one output signal having a first amplitude level corresponding to the first intensity level and a second amplitude level corresponding to the second intensity level, (f) processing the at least one output signal based at least in part upon the first and second intensity levels to form at least one image portion of the indicia, (g) recognizing the indicia based at least in part upon the at least one image portion, and (h) identifying the substrate based at least in part upon the recognized indicia.

2. The method of claim 1 wherein:

step (e) comprises detecting reflected radiation using a substantially linear array of detection devices substantially aligned in the first direction and distributed over a length substantially equal to the radiation length, the plurality of detection devices producing a corresponding plurality of output signals, step (f) comprises:
   (f1) processing the plurality of output signals based at least in part upon the first and second intensity levels to form a corresponding plurality of image portions of the indicia, and
   (f2) combining the plurality of image portions to form a two-dimensional image of the indicia, and step (g) comprises recognizing the indicia based at least in part upon the two-dimensional image of the indicia.

3. The method of claim 1 wherein the surface of the substrate is etched to form a pattern of recesses in the surface of the substrate, the recesses having a nominal breadth in the second direction.

4. The method of claim 3 wherein step (a) comprises illuminating the surface of the substrate with a light beam to form a light footprint on the surface of the substrate, the light footprint having dimensions of the radiation length by the radiation width, where the radiation width is no greater than about one half the nominal breadth of the recesses.

5. The method of claim 1 wherein step (a) comprises illuminating the indicia with incident illumination having a wavelength of about 640 nanometers.

6. The method of claim 1 wherein step (b) comprises moving the radiation source on a motion stage while keeping the substrate stationary.

7. The method of claim 1 wherein step (f) comprises segmenting the at least one image portion of the indicia into individual character segments.

8. The method of claim 7 wherein step (g) comprises:
(g1) recognizing each of the individual segments of the indicia by comparing the individual segments to known patterns, and
(g2) generating an alphanumeric textual string corresponding to the recognized patterns.

9. A method for identifying an integrated circuit substrate having a surface, the method comprising:
(a) forming in the surface of the substrate indicia having an indicia length in a first direction and an indicia width in a second direction, the indicia comprising a pattern of recesses having edge features, each of the recesses having a nominal breadth, the indicia having substantially flat features between the edge features,
(b) illuminating the surface of the substrate with a light beam to form a light footprint on the surface of the substrate, the light footprint having an illumination length substantially in the first direction and an illumination width substantially in the second direction, where the illumination width is no greater than about one half the nominal breadth of the recesses,
(c) generating relative motion between the substrate and the illumination source, thereby scanning the incident illumination over the indicia,
(d) receiving reflected illumination having a first intensity level from the edge features,
(e) receiving reflected illumination having a second intensity level from the substantially flat features,
(f) detecting the reflected illumination using a substantially linear array of detection devices substantially aligned in the first direction and distributed over a length substantially equal to the illumination length, the plurality of detection devices producing a corresponding plurality of output signals having a first amplitude level corresponding to the first intensity level and a second amplitude level corresponding to the second intensity level,
(g) processing the plurality of output signals based at least in part upon the first and second intensity levels to form a corresponding plurality of image portions of the indicia,
(h) combining the plurality of image portions to form a two-dimensional image of the indicia, and
(i) recognizing the indicia based at least in part upon the two-dimensional image of the indicia.

10. The method of claim 9 wherein step (i) comprises segmenting the two-dimensional image of the indicia into individual character segments.

11. The method of claim 10 wherein step (i) comprises:
(i1) recognizing each of the individual character segments of the indicia by comparing the individual character segments to known character patterns, and
(i2) generating an alphanumeric textual string corresponding to the recognized characters.

12. A method for identifying an integrated circuit substrate having a surface, the method comprising:
(a) forming in the surface of the substrate indicia having an indicia length in a first direction and an indicia width in a second direction, and having edge features and substantially flat features,
(b) illuminating the indicia with incident illumination from an illumination source, the incident illumination having an illumination length substantially in the first direction and an illumination width substantially in the second direction,
(c) generating relative motion between the substrate and the illumination source, thereby scanning the incident illumination over the indicia,
(d) receiving reflected illumination having a first intensity level from the edge features of the indicia,
(e) receiving reflected illumination having a second intensity level from the substantially flat features of the indicia,
(f) detecting the reflected illumination using a substantially linear array of detection devices substantially aligned in the first direction and distributed over a length substantially equal to the illumination length, the plurality of detection devices producing a corresponding plurality of output signals having a first amplitude level corresponding to the first intensity level and a second amplitude level corresponding to the second intensity level,
(g) processing the plurality of output signals based at least in part upon the first and second intensity levels to form a corresponding plurality of image portions of the indicia,
(h) combining the plurality of image portions to form a two-dimensional image of the indicia,
(i) segmenting the two-dimensional image of the indicia into individual character segments,
(j) recognizing each of the individual character segments of the indicia by comparing the individual character segments to known character patterns,
(k) generating an alphanumeric textual string corresponding to the character segments, and
(l) identifying the substrate based at least in part upon the alphanumeric textual string.

13. The method of claim 12 wherein step (a) comprises etching the surface of the substrate to form a pattern of recesses in the surface of the substrate, the recesses having a nominal breadth in at least the second direction.

14. The method of claim 13 wherein step (b) comprises illuminating the surface of the substrate with a light beam to form a light footprint on the surface of the substrate, the light footprint having dimensions of the illumination length by the illumination width, where the illumination width is no greater than about one half the nominal breadth of the recesses.

* * * * *